Feb. 13, 1968      N. MOLL      3,368,720
COMMINUTED MATERIALS METERING ASSEMBLY
Filed Oct. 7, 1965      2 Sheets-Sheet 1
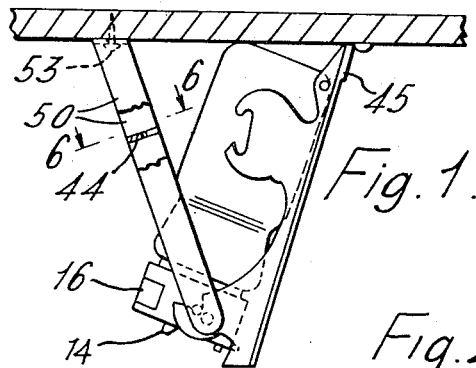
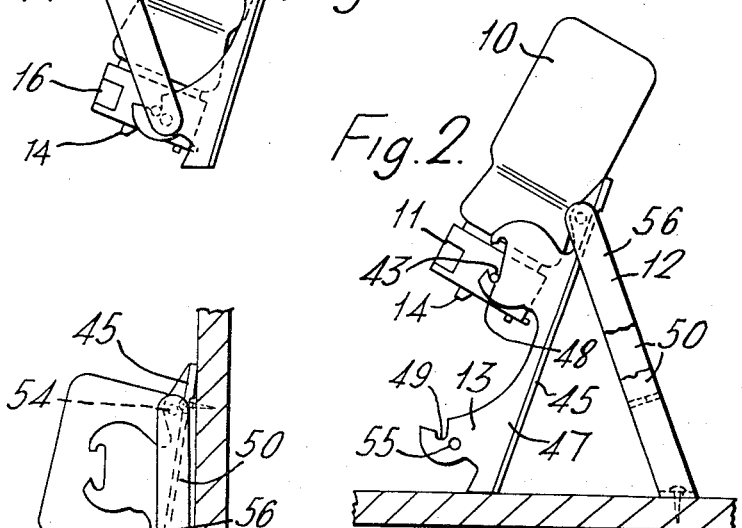
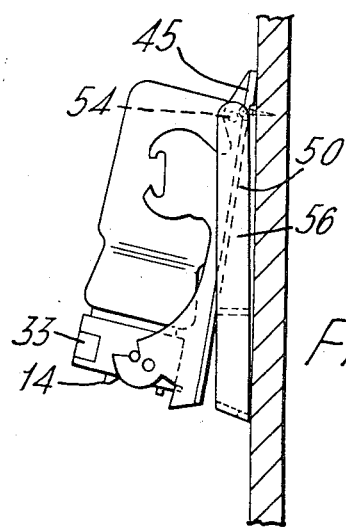
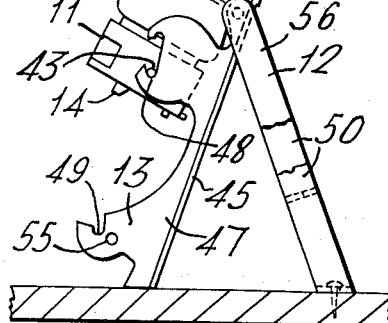
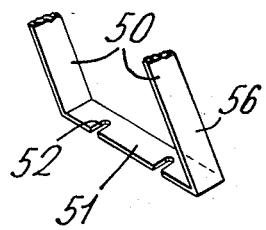
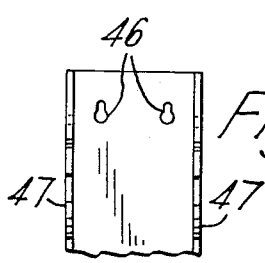
NAYLAND MOLL
INVENTOR
BY *Cecil C. Kent*
ATTORNEY

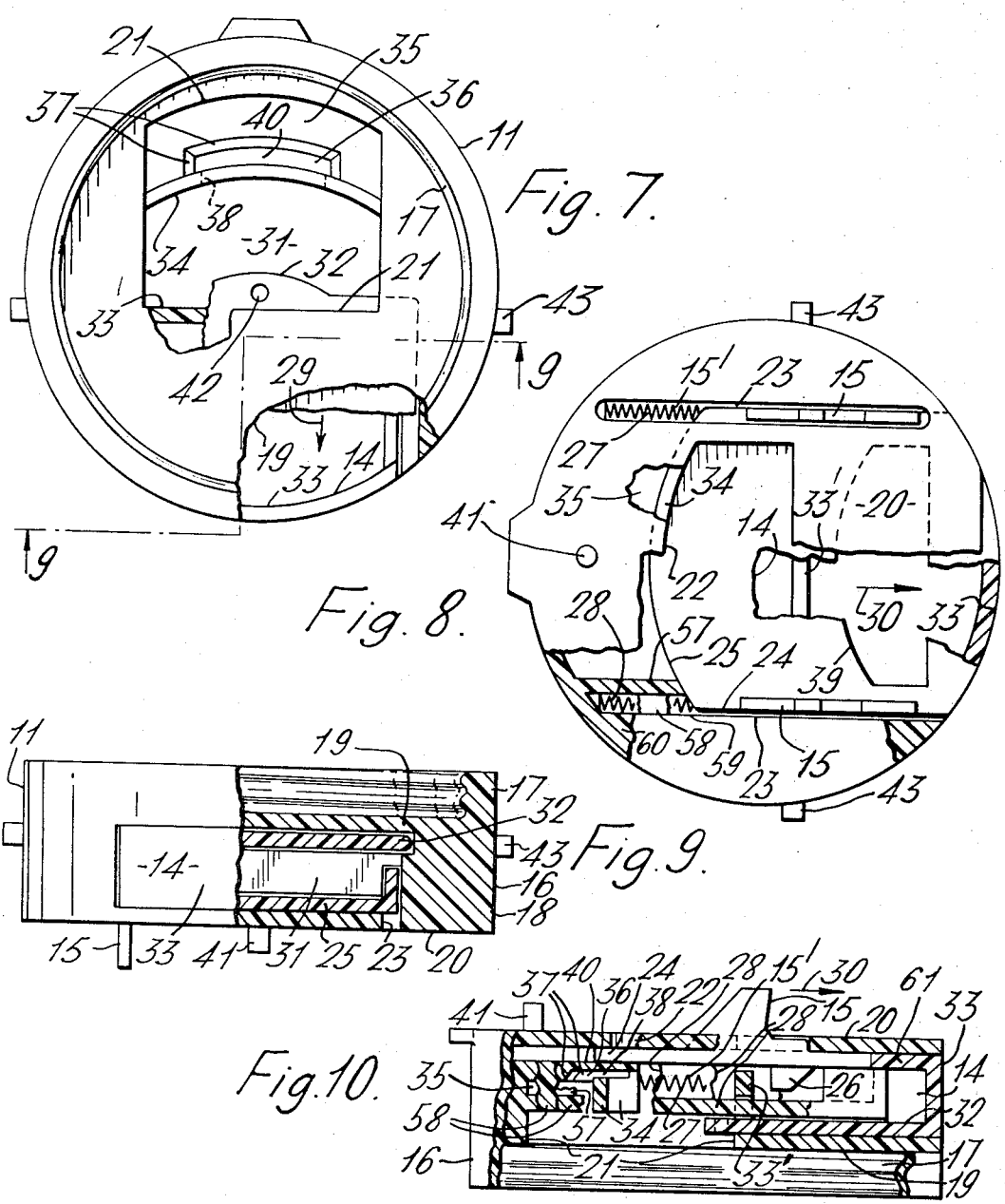

United States Patent Office 3,368,720
Patented Feb. 13, 1968

---

3,368,720
COMMINUTED MATERIALS METERING
ASSEMBLY
Nayland Moll, Toronto, Ontario, Canada
(76 Rochman Blvd., Scarborough, Ontario, Canada)
Filed Oct. 7, 1965, Ser. No. 493,853
1 Claim. (Cl. 222—181)

ABSTRACT OF THE DISCLOSURE

A screw-top metering cap for bottles and the like, intended to be secured reversed upon a wall or to a stand, so that the cap is spaced at least cup-high above a supporting surface, and characterized by downwardly extending projections against which a cup may be pressed so that a measured quantity of comminuted material in the bottle will be precipitated into the cup.

---

The present invention relates to a comminuted materials metering assembly, a novel feature thereof being to provide an assembly of the character herewithin described which is readily adaptable for support upon or suspension from horizontal surfaces such as table and counter surfaces, or overhanging surfaces such as projecting kitchen cupboard surfaces, respectively, as well as for mounting upon vertical walls in such a way that in all cases a clear space is provided below the metering or dispensing cap when attached to an inverted vessel whereby at least a cup, or other like vessels may be inserted therebeneath, and, by being pushed against certain projections forming part of the metering means of the cap will cause a metered quantity of comminuted materials such as coffee or sugar to be delivered into the cup.

A further object is to provide an assembly of the character herewithin described in which, unlike most metering caps for comminuted materials, the metering or transfer chamber is stationary, such arrangement affording the opportunity for inexpensive manufacture and reduction of parts, with, in addition, a lessening of the tendency for the materials being metered and delivered becoming scraped and lodged in crevices and interstices in which it is not intended to be lodged.

A further object is to provide a metering cap including metering means as an essential part thereof which can be very satisfactorily operated manually, in contrast to the rotation of projecting levers and the like, an advantage of the manual manner of operation of the present invention being such that this can be done with one hand and without losing control of the vessel to which the cap is attached, or the assembly as a whole, as for example when it is mounted, easel-fashion (as will presently be explained) upon a supporting surface.

A further object of the present invention is to provide a metering cap which has been designed with particular reference to ease of manufacture from plastic, and for moulding therefrom, as well as with reference to ease and speed of assembly whereby the whole may be marketed for sale at a very low price, or distributed free as a premium to promote sales of a given product such as coffee or the like.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a side elevation of the invented metering assembly shown suspended from an overhanging horizontal surface.

FIGURE 2 is a side elevation showing the invented metering assembly supported upon a horizontal sub-surface.

FIGURE 3 is a side elevation showing the invented metering assembly supported on a vertical surface.

FIGURE 4 is a fragmentary perspective detail depicting the manner in which the connecting element between the legs of the bracket of the supporting structure is adapted to assist in the suspension of the metering assembly as in FIGURE 1.

FIGURE 5 is a fragmentary front elevation of the body plate of the supporting structure indicating the means by which the same may be suspended as in FIGURE 1 illustrated, or as supported from a vertical wall in accordance with FIGURE 3.

FIGURE 6 is a sectional detail on the line 6—6 of FIGURE 1.

FIGURE 7 is a plan view of the invented metering cap seen from the interior face.

FIGURE 8 is a view similar to FIGURE 7 but seen from the exterior face.

FIGURE 9 is a cross-section approximately on the line 9—9 of FIGURE 7.

FIGURE 10 is a cross-section of FIGURE 8.

In the drawings, like characters of reference designate similar parts in the several figures.

The present invention is a metering assembly for comminuted materials comprising the combination with a conventional vessel collectively designated 10, in combination, a metering cap collectively designated 11, and a supporting structure collectively designated 12.

It will be seen by reference to the accompanying FIGURES 1 through 3 that means in the form of the bearing processes collectively designated 13 are provided for maintaining the vessel 10 and metering cap 11 always at least cup-high above any sub-surface regardless of whether the vessel is mounted in the manner of FIGURES 1, 2 or 3.

Metering means collectively designated 14 form an essential part of cap 11 for permitting the gravity delivery of a limited quantity hereof comminuted materials, upon the diametrical sliding actuation thereof relative to the cap. The metering means include at least one projecting element 15, but preferably a pair of the same equally spaced from the perimeter of the cap capable of being interrupted by a receptive cup or the like, and of being shifted thereby to actuate the metering means slidably into delivering position as presently to be described in greater detail. Spring means collectively designated 15' are provided for returning the metering means to the position illustrated in the accompanying FIGURES 7 through 10.

Proceeding therefore now to describe the present invention in greater detail, and considering first the metering cap per se of the aforesaid FIGURES 7 through 10, such cap may be seen to comprise, in combination with the metering means 14, a shallow cylindrical body generally designated 16 screw-threaded on one of the opposite sides thereof by the provision of the internally screw-threaded annular flange 17. The cylindrical body 16 may be said to be bounded by the surrounding wall 18 within which are spaced interior and exterior faces 19 and 20 respectively, spanning the surrounding wall 18.

Face 19 is provided with the enlarged release aperture 21. Within the face 20 is the aperture 22. Also formed in the exterior face 20 are the elongated slots 23 within which move the projecting elements 15. These projecting elements are positioned upon the lateral edges 24 of the valve plate 25. Projecting downwardly from the edges 24 are abutments 26 against which one end of each of the springs 27 bears, the said springs being retained within square tubular housings collectively designated 28 so that the metering means 14 are forced in the direction of arrows 29 (FIGURE 7) and 30 (FIGURES 8 and 10).

Capable of covering at least the central portion of aperture 21, which, as presently will become apparent constitutes a metering chamber 31, is plate 32. Connecting plates 25 and 32 is a plate-connecting means 33 in the form of an arcuate or semicircular wall portion co-terminous with surrounding wall 16. The parts 25, 32 and 33 predominantly comprise the metering means 14 of the present invention.

Spanning the interior of the metering cap 11, in spaced relationship are two, stationary metering-chamber defining walls 33' and 34 of which the first is flat, and the second curved. These walls are secured at their ends to the body-material of the cap (which is preferably, though not necessarily, plastic) as exemplified in the accompanying FIGURE 9.

Wall 34 separates metering chamber 31 from a supplementary chamber 35. The only purpose of this chamber is to reduce friction as the plate 32 slides over it. In other words, it represents only a hogging-out of solid material for this purpose. Within the chamber 35 is an arcuate well 36 the surrounding edges 37 of which are bevelled. In the base of wall 34 an elongated slot 38 is provided. This is provided obviously since the hogged-out well or chamber 35 becomes filled with comminuted material, and through the slot may be leaked a trickle of such materials when the plate 32 is in position to expose aperture 22, it being understood that plate 25 is itself provided with the aperture 39 which is capable of registration with aperture 22, plate 25 being what is herein defined as the discharge plate while plate 32 is defined as the interior intercepting plate.

The well 36 is closed by the portion 40. The projection 41 is a third leg co-acting with parts 15 to support the cap and associated bottle inverted and "off the floor" should it be desired to discard its supporting structure 12 under some circumstances of use. Aperture 42 is provided in plate 32 for the attachment of a projecting agitator of any desired configuration if desired. Projecting slightly off diametrical relationship is a pair of trunnions 43 to facilitate over-tilt of the inverted vessel and cap if desired, either towards the body plate of the supporting structure illustrated in the accompanying FIGURES 1 through 3 and 5 or toward the stop-strip 44 thereof about to be described.

Proceeding next to describe the supporting means of the said FIGURES 1 through 6, it will be apparent that the same comprises the noted body plate 45 provided with apertures 46 of the general configuration illustrated in the accompanying FIGURE 5 for the accommodation of projecting screws or cup-hooks. Extending upon the longitudinal edges of body plate 45 are bearing processes generally designated 47 including upper and lower pairs of bearings 48 and 49 respectively. The trunnions 43 engage the upper of these when the supporting structure is arranged as depicted in the accompanying FIGURE 2. When the vessel and cap are in relationship to the supporting structure as illustrated in the accompanying FIGURES 1 and 3, bearings 49 are employed.

The supporting structure also comprises the pair of parallel and spaced legs 50 spanned at least near one end thereof by the connecting element 51 provided with the open ended slots 52 for engagement with a pair of screws or the like when the supporting structure is in the position of the accompanying FIGURE 1. The opposite ends of the legs are provided with inwardly projecting trunnions 54 engageable with pairs of apertures 55 at both ends of the bearing processes 47 whereby the supporting bracket collectively designated 56 may be attached to either end of the body portion and bearing processes. By best reference to the accompanying FIGURE 1 the purpose of element 44 will plainly be discerned, the same being for the purpose of preventing accidental overturning outwardly of the vessel 10.

Reference to the accompanying FIGURE 3 will indicate that the bracket 56 may also be employed to angle outwardly the plate 45 when the assembly is hung upon a vertical wall. From the foregoing also it will be apparent that the particular metering means employed, and especially the large arcuate portion 33' co-terminous with the perimeter of the cap provides a very comfortable and well controlled means for metering a quantity of materials with one hand, in which case the thumb is placed against the portion 33' while the rest of the hand can steady the vessel. On the other hand it will be clear that an approximate metered quantity of materials may readily be released simply by pushing a cup against the projections 14.

In conclusion it will be apparent that the tubular enclosures 28 for the springs 27 comprise the side wall portions 57, the under-wall portions 58, and the opposite side wall portions 59 which are formed of the exposed surface of the solid segmental body material 60 all as best illustrated in the accompanying FIGURES 8 and 10 where one of the springs 27 is shown broken, the better to illustrate the accommodating tubular passage ways 28.

Since various modifications can be made to the invention herein described within the scope of the inventive concept disclosed, it is not intended that protection of the said invention should be interpreted as restricted to the modification or modifications or known parts of such concept as particularly described, defined or exemplified, since this disclosure is intended to explain the construction and operation of such concept and is not for the purpose of limiting protection to any specific embodiment or details thereof.

What I claim as my invention is:

1. A metering assembly for comminuted materials comprising the combination with a vessel, in combination, a metering cap for said vessel and a supporting structure, means co-operating between said cap and said supporting structure for sustaining said vessel inverted and spaced at least cup-high above a sub-surface, and metering means forming an essential part of said cap for permitting the gravity delivery of a limited quantity of said materials upon diametrical sliding actuation relative to said cap, said metering means including at least one projecting element capable of being intercepted by a receptive cup or the like and of being shifted thereby to actuate said metering means slidably to delivering position, and spring means for returning said metering means, said cap including a pair of trunnions, said supporting structure being adaptable to the sustentation of said vessel and cap in the manner stated when placed upon or suspended from a horizontal surface, or when mounted upon a vertical surface, and composed of a body-plate, upper and lower pairs of bearing processes projecting from the opposite edges of said plate including bearings in which said trunnions may be journalled, and a plate-supporting bracket in the form of a pair of parallel and spaced legs, a connecting-element between said legs at least near one end thereof, said connecting element being provided with at least one open-ended slot upon its length and means co-acting between the opposite ends of said legs and said bearing processes for removably attaching said legs to said processes.

References Cited

UNITED STATES PATENTS

| | | | |
|---|---|---|---|
| 134,928 | 1/1873 | Price et al. | 222—451 |
| 2,041,887 | 5/1936 | Ward | 222—449 |
| 2,162,068 | 6/1939 | Duell et al. | 222—451 |
| 2,171,651 | 9/1939 | Hahn | 222—451 |
| 2,372,544 | 3/1945 | Borman et al. | 222—181 X |
| 2,556,826 | 6/1951 | Stone | 222—181 X |
| 3,254,802 | 6/1966 | Barnes | 222—181 |

WALTER SOBIN, *Primary Examiner.*